United States Patent
Valembois

(10) Patent No.: US 8,220,598 B2
(45) Date of Patent: Jul. 17, 2012

(54) FRICTION DEVICE FOR CONTROLLING FORCE, AND A FRICTION DAMPER COMPRISING SUCH A DEVICE

(75) Inventor: Guy Valembois, Toulouse (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 460 days.

(21) Appl. No.: 12/438,067

(22) PCT Filed: Sep. 13, 2007

(86) PCT No.: PCT/FR2007/051931
§ 371 (c)(1),
(2), (4) Date: Mar. 19, 2009

(87) PCT Pub. No.: WO2008/031998
PCT Pub. Date: Mar. 20, 2008

(65) Prior Publication Data
US 2010/0052232 A1 Mar. 4, 2010

(30) Foreign Application Priority Data
Sep. 14, 2006 (FR) ..................................... 06 53744

(51) Int. Cl.
*B60K 41/26* (2006.01)
*F16D 55/48* (2006.01)
(52) U.S. Cl. ...................... 188/129; 188/134; 192/223.3
(58) Field of Classification Search ................. 74/89.39, 74/424.72; 188/67, 71.5, 129, 134–136, 188/181 T, 82.1–82.3, 82.34, 82.4–82.7, 188/82.74, 82.77, 82.8, 82.84, 82.9, 83, 84, 188/85; 192/41 S, 45.1, 55.2–55.6, 110 B, 192/223, 223.3
See application file for complete search history.

(56) References Cited

U.S. PATENT DOCUMENTS

| 1,654,763 | A |   | 1/1928 | Tauscher |
| 3,630,327 | A | * | 12/1971 | Nelson .......................... 192/223 |
| 3,630,328 | A | * | 12/1971 | Nelson .......................... 192/223 |
| 4,603,594 | A | * | 8/1986 | Grimm ......................... 74/89.39 |
| 5,299,676 | A | * | 4/1994 | Wade .......................... 192/223.3 |
| 5,551,510 | A | * | 9/1996 | Mills ............................... 166/68 |
| 5,927,453 | A | * | 7/1999 | Hinterlechner ............. 192/12 R |
| 5,944,148 | A | * | 8/1999 | Bae et al. ...................... 188/134 |
| 6,964,326 | B2 | * | 11/2005 | Kamping ..................... 192/55.5 |
| 7,980,372 | B2 | * | 7/2011 | Wiesneth et al. ............... 192/46 |

FOREIGN PATENT DOCUMENTS

| BE | 377729 | 3/1931 |
| GB | 212522 | 5/1924 |
| GB | 260740 | 11/1926 |

* cited by examiner

*Primary Examiner* — Christopher Schwartz
(74) *Attorney, Agent, or Firm* — Egbert Law Offices PLLC

(57) ABSTRACT

Friction device includes at least two members, one of which is mobile, or potentially mobile, in terms of relative displacement with respect to the other under the action of an external stimulus. The relative displacement is liable to cause the relative displacement of two friction surfaces subjected to pressing forces, so as to convert the external stimulus into a friction force and to thus control the displacement of the mobile or potentially mobile member. The pressing forces are produced by pre-stressing mechanisms and the members are able to act on the effects of the pre-stressing mechanisms so as to use the resultant effect of the relative displacement of the mobile or potentially mobile member to reduce the pressing forces.

10 Claims, 3 Drawing Sheets

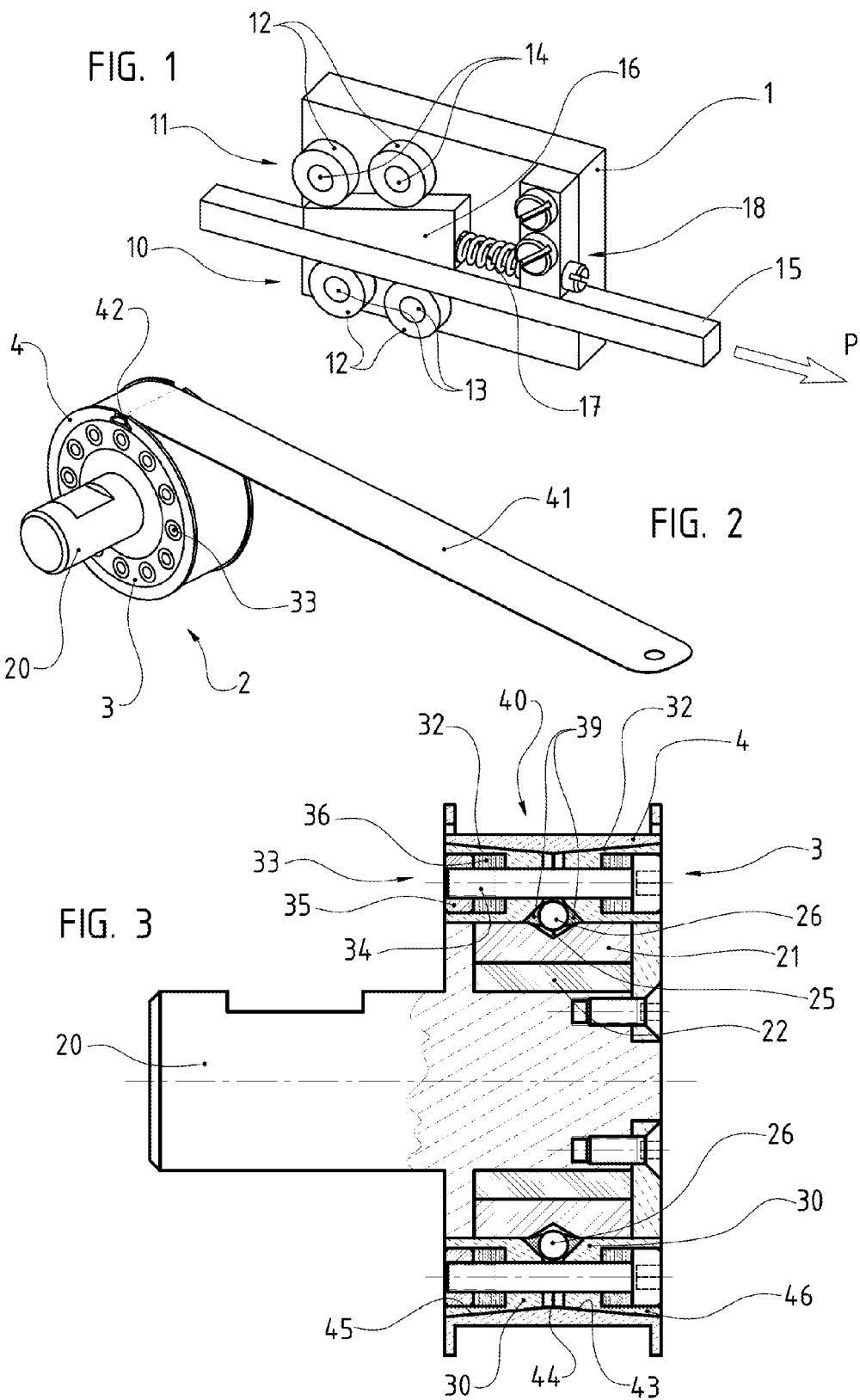

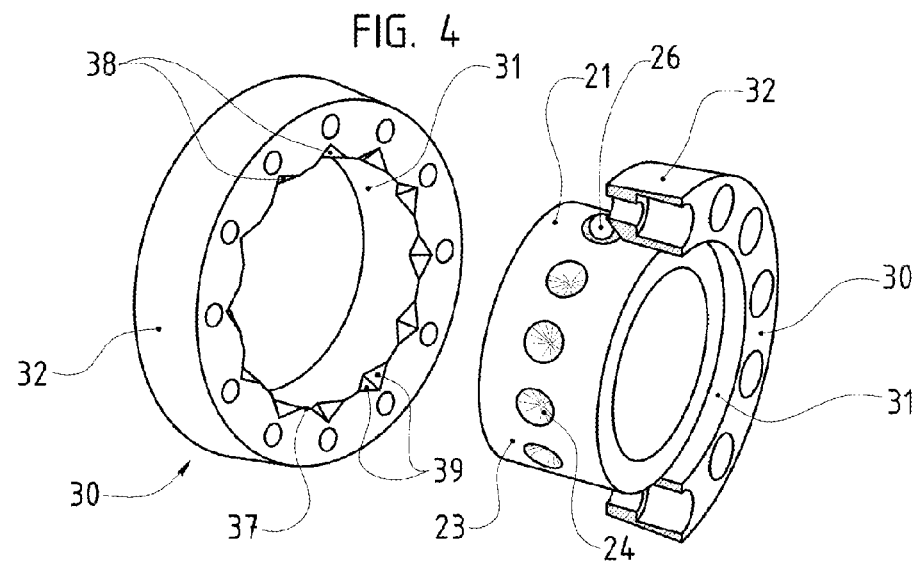
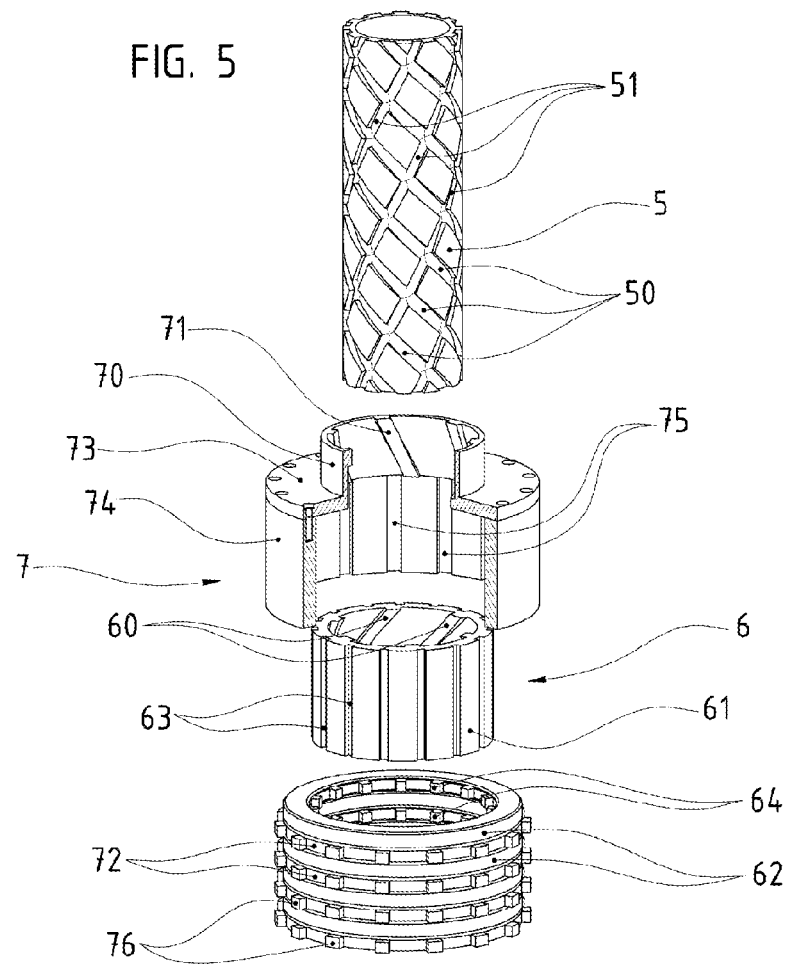

FRICTION DEVICE FOR CONTROLLING FORCE, AND A FRICTION DAMPER COMPRISING SUCH A DEVICE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a friction device for controlling force, and a friction damper comprising such a device.

2. Description of Related Art Including Information Disclosed Under 37 CFR 1.97 and 37 CFR 1.98.

There are already known friction devices for controlling force, namely used in friction damping devices. The general principle consists of using two friction surfaces with relative displacement pressed against each other so as to transform the normal force at said surfaces into a friction force capable of creating a damping force.

Generally, these damping devices comprise at least two organs, one of which is movable in displacement with respect to the other one under the action of an external force. The displacement is likely to cause the relative displacement of two friction surfaces subjected to pressing forces, so as to transform said external force into a friction force and to thus dampen the displacement of said movable organ.

The friction devices are used in different fields, both, non-restrictively, in that of air, road and railway transport for damping, breaking, clutch or transmission, torque-limiting systems and in that of weapons for damping the return of the firearms.

However, controlling the force of a friction device occurs through the normal pressing force, so that it directly depends on the friction coefficient of the materials of the friction surfaces, which leads to uncertainties about the returned force or about its repeatability and stability over the time.

From GB 2 60 740 is also known a shock absorber for vehicles aimed at being used to damper springs. The invention comprises friction elements such as discs, movable in displacement with respect to each other under the action of a displacement, associated with springs the action and the thrust of which are controlled to put the friction elements under pressure. This pressure varies according to the direction of said movement, i.e. this pressure is applied in one direction, while it is suppressed in the other direction. To this end, one portion of the friction elements is screwed onto a threaded coaxial element, and the thrust of the springs is axially applied on the side opposite the one including the other portion of the friction elements. Thus, the pivoting in the direction of the screwing conjugated with the thrust causes the friction to increase, while the pivoting in the other direction tends to separate the friction elements and to suppress the contact between them.

The operation of such a shock absorber is of the "on-off" type and does not permit control of the force. It is provided for assisting a damper system, i.e. it oscillates according to the normal operation of the damper system and is blocked when the oscillation reaches a determined magnitude in the direction of compression of the spring of said damper system. It does therefore not permit calibration of the damping force in only one direction, since, in order the remove the blocking, a change of direction of the force is necessary.

BRIEF SUMMARY OF THE INVENTION

The present invention is aimed at coping with the various above-mentioned drawbacks by providing a friction device for controlling the force permitting that the level of returned force is almost independent from the friction coefficient of the materials the friction surfaces are made of and which therefore permits to control said returned force.

The friction device according to the invention is of the type comprising at least two organs, one of which is movable, or potentially movable, in terms of relative displacement with respect to the other one under the action of an external stimulus. The relative displacement is likely to cause the relative displacement of two friction surfaces subjected to pressing forces so as to transform said external stimulus into a friction force and to thus control the displacement of said movable, or potentially movable, organ. The pressing forces are produced by pre-stressing means, and said organs are designed capable of acting on the effects of the pre-stressing means so as to use the resulting effect of the relative displacement of said movable, or potentially movable, organ in order to reduce said pressing forces.

Such a friction device permits, starting from a pre-stressing of known intensity, to achieve in an exact way the control of a force, independently from the friction coefficients of the friction surfaces.

According to a first embodiment of the friction device according to the invention, the organs are movable, or potentially movable, with respect to each other in a rotation motion and are associated to means for transforming a rotation motion into a rectilinear movement, while an annular element is intercalated between said organs, and said annular element is:

capable of being blocked in rotation on one of said organs, at least in one direction of rotation, so as to generate a friction torque between said annular element and the other organ, associated to elastic pre-stressing means capable of increasing said friction torque, and associated to means capable, under the effect of, on the one hand, the rotation of the movable organ generated by the external force and, on the other hand, the resisting force resulting from the friction, of reducing the effects of said elastic pre-stressing means.

According to an additional feature of the first embodiment of the friction device according to the invention, the annular element is formed of a coaxial assembly of two rings having, each, a friction surface and shaped so that the modification of the distance separating them, obtained under the action of the elastic pre-stressing means, acts on the nearing of the friction surfaces of said rings to those of the movable organ.

According to another additional feature of the first embodiment of the friction device according to the invention, the friction surface of each of the rings is coaxially truncated, while the friction surface in front of the movable organ is also coaxially truncated and according to the same angle.

According to another additional feature of the first embodiment of the friction device according to the invention, it includes a ring blocked in rotation, at least in one direction of rotation, on the immobilized organ. The annular element is made integral in rotation with through balls accommodated in cavities uniformly distributed at the periphery, each being formed by the coincidence of two recesses, one being provided for in said ring and the other one in said annular element. For one half in each of the rings forming same, the recess provided for in said annular element is in the form of ramps so that during a relative rotation motion of said annular element with respect to said ring, said balls rest against said ramps so as to cause the separation of said rings.

According to another additional feature of the first embodiment of the friction device according to the invention, the rings each have a truncated external wall so as to confer to the annular element, by nearing said rings to each other, a substantially twin-wheel shape, while the movable organ is in the form of a pulley mounted on said annular element and the inner wall of which, which forms a friction surface aimed at co-operating with the external wall of said annular element, which forms the other friction surface, has a complementary shape and includes to this end a peripheral median ridge, which separates it into two parts that each have of truncated shape, and oriented divergently, and wherein on said pulley is fixed and wound a means capable of being subjected to the external force.

According to another additional feature of the first embodiment of the friction device according to the invention, the annular element is connected to one of the organs through a free wheel.

According to a second embodiment of the friction device according to the invention, the organs are movable with respect to each other in a rectilinear translation movement, and include means for transforming said rectilinear movement into two rotation movements coaxial to said translation movement and in opposite directions, so as to drive into reversed rotations friction surfaces brought into contact through pressing means.

According to an additional feature of the second embodiment of the friction device according to the invention, one of the organs consists of a rod provided with a threaded portion with several left-hand threads, and with a threaded portion with several right-hand threads, onto which are screwed two nuts, one of them with a left-hand thread and the other one with a right-hand thread, each of them being associated to at least one friction surface.

According to an additional feature of the second embodiment of the friction device according to the invention, it includes a pile of annular shaped discs inserted onto the rod, each of which being alternately connected in rotation to one of the nuts.

According to an additional feature of the second embodiment of the friction device according to the invention, the two nuts and their discs are accommodated in a body that contains the pressing means, which consist of elastic means capable of exerting a pressing force on the pile of discs.

According to an additional feature of the friction device according to the invention, irrespective of the contemplated embodiment, the pre-stressing means consist of pressing means of adjustable intensity.

According to an additional feature of the friction device according to the invention, the pre-stressing means consist of hydraulic, pneumatic or electric actuators.

The advantages and features of the friction device according to the invention will become clear from the following description referring to the attached drawing, which represents several non-restrictive embodiments of same.

BRIEF DESCRIPTION OF THE SEVERAL VIEWS OF THE DRAWINGS

FIG. 1 represents a schematic view illustrating the principle of the friction device according to the invention.

FIG. 2 represents a perspective schematic view of a first embodiment of a device according to the invention.

FIG. 3 represents a schematic median cross-sectional schematic view of the same device.

FIG. 4 represents a perspective and exploded schematic view with a cut-out of part of the same device.

FIG. 5 represents a partial, perspective and exploded schematic view with a cut-out of a second embodiment of the device according to the invention.

DETAILED DESCRIPTION OF THE INVENTION

Figure 6:
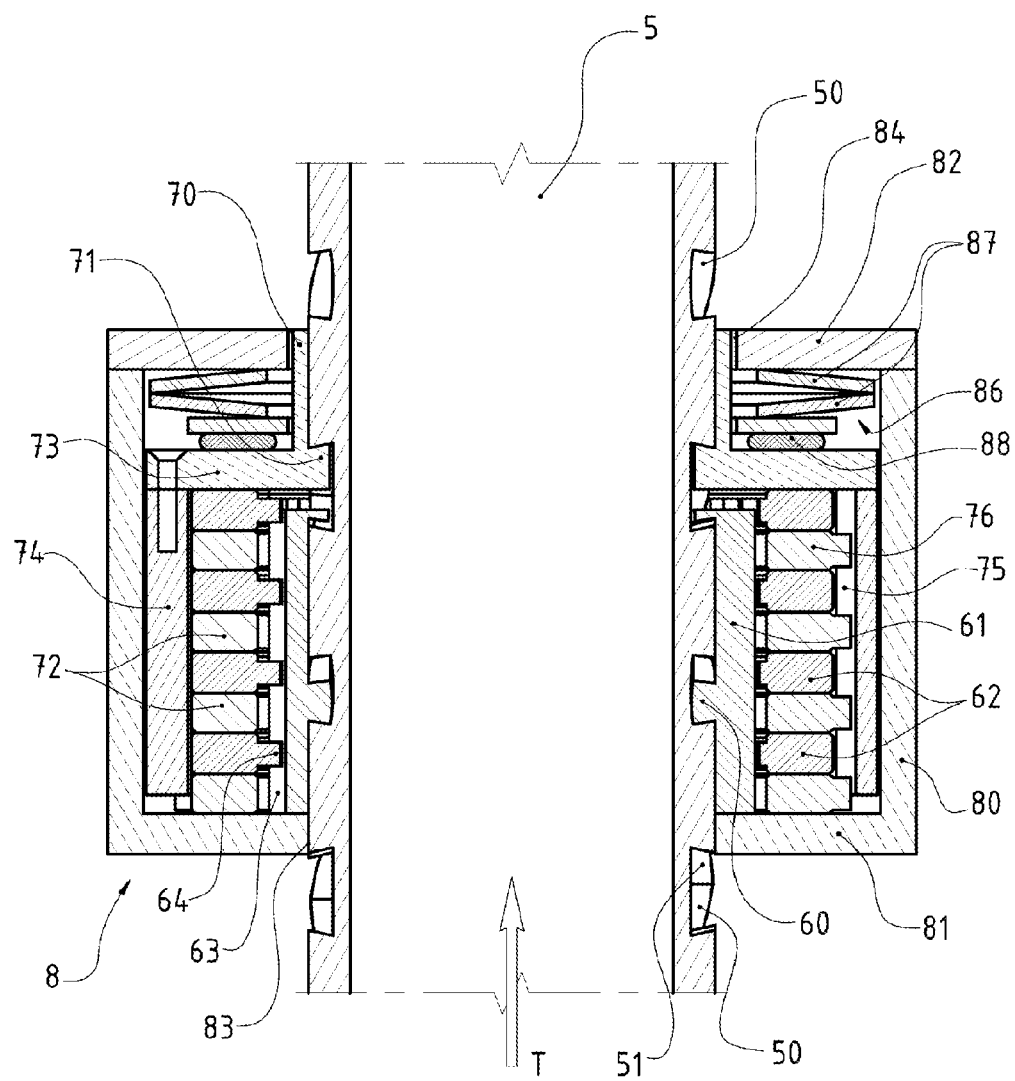
FIG. 6 represents a schematic median cross-sectional schematic view of the same device.

When referring to FIG. 1, one can see a mounting permitting to illustrate the principle of the friction device according to the invention.

This mounting comprises a plate 1, which carries two pairs 10 and 11 of rollers 12 that are all mounted on axes, respectively 13 and 14, parallel, perpendicular to a plane of the plate 1. The alignment of the axes 13 of the rollers 12 of the pair 10 is not parallel to the alignment of the axes 14 of the rollers 12 of the pair 11, they indeed form a certain angle.

The mounting also includes, on the one hand, a rectilinear rod 15 placed on the rollers 12 of the pair 10 and, on the other hand, a wedge 16 intercalated between the rod 15 and the rollers 12 of the pair 11, the wedge 16 being shaped so that these faces in contact with the rollers 12 form the same angle as the one formed by the aforementioned alignments.

Furthermore, the wedge 16 is pushed back, parallel to the rod 15, against the rollers 12 of the pair 11, by means of a spring 17 co-operating with a system 18 for adjusting its tension.

The spring 17 exerts a force on the wedge 16, which force is transformed into a normal force between the wedge 16 and the rod 15.

In the case of a relative movement between the rod 15 and the wedge 16 is created a tangential force between the sliding surfaces and, during a relative displacement of the rod 15 with respect to the plate 1, the system is blocked in the direction of the thrust of the spring 17, while it is functional in the oppose direction P.

It will be understood that the displacement of the rod 15 in the direction of P depends very little, and almost not at all, on the friction coefficient of the materials the rod 15 and the wedge 16 are made of, but that it depends, on the other hand, on the pre-stressing force exerted by the spring 17, which force, since it is adjustable and also depends on the damper force, permits an adjustment of the returned force.

This friction device is not of the on-off type, in a direction of displacement, the opposite direction to P, occurs a blocking, while in the other direction occurs a control of the displacement.

When referring now to FIGS. 2, 3 and 4, one can see a first embodiment 2 of the friction device according to the invention.

In particular in FIG. 3 one can see that this friction device 2 comprises a shaft 20, on which is mounted a ring 21, above which is mounted an annular element 3, above which is mounted a pulley 4.

It should be noted that the ring 21 is mounted on the shaft through a free wheel 22, which permits only one direction of rotation of the ring 21 on the shaft 20.

When referring also to FIG. 2, one can see that the pulley 4 externally includes a groove 40 in which is wound a foil 41, which is firmly coupled by one end to the pulley 4 at one coupling point 42.

As can be seen more accurately in FIG. 4, the annular element 3 consists of a coaxial assembly of two rings 30 having internally a cylindrical wall 31 adapted to the outer wall 23 of the ring 21, and externally a truncated wall 32, so that the annular element 3 is twin-wheel shaped.

Furthermore, in FIG. 3 one can observe that the pulley 4 includes an internal wall 43 having a particular shape, i.e. a bi-conical shape. This internal wall 43 indeed includes a peripheral median ridge 44, which separates into two parts 45 and 46, each having a truncated shape, and oriented divergently, i.e., its outer edge has a diameter larger than that of the ridge 44.

The slopes of the parts 45 and 46 are of course according to the same angle as the slopes of the walls 32 of the rings 30, so as to achieve a perfect adaptation of the pulley 4 on the annular element.

The nearing to each other of the two rings 30 inside the pulley 4 is performed through a plurality of holding elements 33 distributed at the periphery, each formed of a screw 34 passing through the two rings 30 and a nut 35, which compress against the latter elastic means 36, in this case superposed elastic washers, for example of the Belleville type.

The two rings 30 are thus compressed, each, through their wall 32 against a part 45 or 46, and elastically because of the elastic means 36.

Thus, between the annular element 3 and the pulley 4 is created a friction torque the value of which varies according to the nature of the elastic means 36, according to the number of holding means 33, and according to the tightening couple of the screws 34 and the nuts 35. The holding means 33 thus form pre-stressing means permitting to brake a relative displacement in rotation of the pulley 4 on the annular element 3 through a pulling force on the foil 41.

In FIGS. 3 and 4, one can see that in the outer wall 23 of the ring 21 are provided for recesses 24, which are uniformly separated from each other and distributed according to a median line, while the wall 31 of each one of the rings 30 has, on its ridge 37 at the inner side of the annular element 3, notches 38, which are uniformly separated from each other and have the same angular distance as the recesses 24, so that, during the nearing of the two rings 30, two notches 38 facing each other form a recess that forms, in co-operation with the recess 24, a cavity 25, visible in FIG. 3, aimed at containing a ball 26.

The balls 26 constitute the only connecting means between the ring 21 and the annular element 3, the cavities 25 being dimensioned so as to permit only a functional backlash of the balls 26.

Though the recesses 24 have a shape that can be any shape whatsoever, in this case the shape of a cap, the notches 38 have a particular shape, i.e., they are formed of two inclined planes 39, so that the recesses obtained through the nearing of the rings 30 to each other have a pyramidal shape.

During the putting into rotation of the annular element 3 in the direction opposite that permitted by the free wheel 22, the contact of the balls with the inclined planes 39, which then form ramps, tends to cause the rings 30 to separate from each other.

In use, non-restrictively, the shaft 20 is fixed, the foil 41 is connected to the object in movement to be damped. During a pulling on the foil, the pulley 4 rotates on the annular element 3, the rotation being limited by the frictions between the internal wall 43 and the walls 32.

If the friction torque is too high, an adhesion of the pulley 4 to the annular element 3 occurs, which results into a relative rotation of the annular element 3 on the ring 21 and thus, because of the co-operation of the balls 26 with the inclined planes 39, a separation of the rings 30 and a lowering of the friction torque.

The friction torque is thus determined by the rivalry between two antagonistic functions exerted, one by the tightening of the rings 30 on the pulley 4 through holding elements 33 and the action of the elastic means 36, and the other one through the loosening of the rings 30 induced by the relative rotation motion of the annular element 3 on the ring 21 and the action of the balls 26 on the inclined planes 39.

The rotation motion of the pulley 4 on the annular element, i.e., the damper force, depends very little on the friction coefficient of the materials they are made of, it essentially depends on the holding elements 33, which exert a pressing force in association with the elastic means 36, which exert a pre-stressing force, while the damper force acts, through the balls 26 and the inclined planes 39, on the holding elements 33 and the elastic means 39 so as to reduce the pressing force.

It should be noted that it is contemplated that the foil 41 be preformed to a diameter smaller than that of the pulley 4, in order to provide it with a spring function, so that, when releasing the pulling force, it is restored to its initial shape and winds up on the pulley, which is possible because of the interposition of the free wheel 22 between the ring 21 and the shaft 20.

This embodiment of the friction device according to the invention can be used for example as a damper device in a weapon system in order to limit the effects of the return of a barrel of a weapon. The return of the barrel drivel the foil 41 in translation, which causes the pulley 4 to rotate. When the external stress is stopped, the foil 41 recovers its shape and permits the barrel to return to its initial position.

Of course, numerous variants are possible, thus, the conical friction surfaces can be replaced by simple flat surfaces or surfaces of multiple type as in the multi-disc brakes, depending on the global geometry of the damper to be designed.

The separating system with balls can also be replaced by any other system permitting to carry out the same function, i.e., a helical ramp or a cam.

While the system comprised of a foil and a pulley can be replaced by a system comprised of a pulley and a belt with or without notches, a system comprised of a pulley and a cable or a system comprised of a pinion and a rack.

When referring now to FIGS. 5 and 6, one can see another embodiment of the friction device according to the invention.

It comprises a rod 5 aimed at moving in axial translation under the effect of a pushing or pulling force and the external wall of which is provided with, on the one hand, a threaded portion with several left-hand threads 50 and, on the other hand, a threaded portion with several right-hand threads 51. Thus, the threads 50 and 51 intersect, it should be noted that they do not necessarily have the same pitch.

The device also comprises, on the one hand, a nut 6 having a left-hand thread 60 shaped so as to co-operate with the left-hand threads 50 and, on the other hand, a nut 7 having a right-hand thread 71 shaped so as to co-operate with the right-hand threads 51.

One will understand that the relative displacement in translation of the two nuts 6 and 7 in the same direction along the rod 5 causes opposite rotations of the two nuts 6 and 7.

The device also comprises a series of friction discs 62 blocked in rotation on the nut 6, as well as a series of discs 72 blocked in rotation on the nut 7, the discs 62 and 72 being alternately piled up in one single pile.

To this end, the nut 6 is in the form of a tubular sleeve 61 including internally the left-hand threads 60 and externally longitudinal grooves 63 arranged according to generating lines, while the discs 62 are in the form of rings including, at their internal periphery, channels 64 aimed at co-operating with the grooves 63 so as to achieve a blocking in rotation of the discs 62 on the sleeve 61.

Likewise, the nut 7 is in the form of a tubular sleeve 70 provided internally with right-hand threads 71 and externally with a flange 73 bearing an external skirt 74 in the form of a sleeve having, on its internal wall, longitudinal grooves 75 arranged according to generating lines, while the discs 72 have externally channels 76 aimed at co-operating with the grooves 75 so as to achieve a blocking in rotation of the discs 72 on the skirt 74 and, therefore, through the flange 73, on the sleeve 70.

One will understand that the relative displacement in translation of the two nuts 6 and 7 in the same direction along the rod 5 causes opposite rotations of the discs 62 and 72 while they are in contact with each other.

When referring now in particular to FIG. 6, one can see that the unit comprised of the two nuts 6 and 7 their discs, respectively 62 and 72, is enclosed in a body 8 forming a cage.

This body 8 comprises, on the one hand, a tubular sleeve 80, surrounding externally the two nuts 6 and 7, and which is closed at each of its ends by an annular part 81 and 82.

The annular part 81 has an opening 83 with a diameter between the outer diameter of the rod 5 and the outer diameter of the sleeve 61, so as to be able to abut against the latter.

The annular part 82 has an internal opening 84 with a diameter larger than the outer diameter of the sleeve 70, so as to permit an axial displacement of this sleeve 70 in this opening 84.

Finally, the sleeve 80 is shaped so as to be accommodated in an annular space 85 provided for between the flange 73 and the annular part 82, elastic means 86 capable of separating from each other the flange 73 and the annular part 82 and, hence, of pressing against the ends of the pile of discs 62 and 72.

These elastic means 86 consist in this case of a pile of elastic washers 87 of the Belleville type associated to a thrust 88, of the needle bearing type, intercalated between the pile and the flange 73 so as to permit the rotation of the nut 7 with respect to the body 8.

According to a non-restrictive mode of operation, an external stress T applied to the rod 5 drives the latter in translation, which generates the rotations in opposite directions of the nuts 6 and 7, causing the friction discs 62 and 72 to slide on each other. A friction torque appears between each friction surface because of the pressing force exerted by the elastic means 86. This friction torque is transformed by the two systems comprised of a screw and nut into two axial braking forces onto the rod 5, in order to create a damper force.

In order to make the system reversible, one of the nuts, preferably the nut 7, should be mounted in series with a free wheel, not shown, so as to permit the return movement of the rod 5.

Furthermore, since the body 8 is designed integral with the object to be damped, or vice-versa, the translation of the rod 5 tends to compress the elastic means, so that the damper force tends to reduce the pre-stressing and hence the friction force, which permits to achieve a regulation of this friction force depending on the damper force.

It should be noted that the elastic means 87 can be made in various ways, they can thus consist of pneumatic, hydraulic or electric actuators, for example jacks, which permits an additional adjustment, eventually in real time.

Irrespective of the embodiment of the friction device according to the invention, it has been calculated that strongly varying the friction coefficient only varies the returned force in a non-substantial way.

The preferred application of the friction device according to the invention consists in a friction damper-device made according to any embodiment.

The friction device according to the invention can however find many other applications, such as, non-restrictively, in the field of braking, transmission, servo-control of both braking and clutch.

I claim:

1. An apparatus comprising:
    at least a pair of members of which one of the members is relatively movable with respect to another of the members under a directional force applied by an external stimulus, the relative movement of the members causes a relative displacement of a pair of friction surfaces so as to convert the external stimulus into a friction force so as to control the movement of said one of the members;
    a prestressing means for pressing on said pair of friction surfaces, the members being cooperative with said prestressing means, the directional force controlling an amount of the relative displacement, a force in a direction opposite said directional force causing a blocking of the relative displacement, the members being rotationally movable with respect to each other;
    a means for transforming the rotational movement into a rectilinear movement;
    an annular element intercalated between the members, said annular element being blocked from rotation on one of the members so as to create a frictional torque between said annular element and the other member, said annular element being a coaxial assembly of two rings, each of said two rings having a friction surface; and
    a ring element blocked in rotation in at least one direction of rotation, said ring element positioned on the immobilized member, said annular element positioned on balls received respectively in cavities in said ring element and coincident cavities in said annular element, said cavities distributed uniformly around a periphery of said annular element and uniformly distributed around a periphery of said ring element, said cavities in said annular element having a ramp shape such that during a relative rotation of said annular element with respect to said ring element the balls rest on the ramp shape of the cavities so as to cause a separation of the rings.

2. The apparatus of claim 1, said friction surface being coaxially truncated.

3. The apparatus of claim 2, the two rings each having a truncated outer wall, the movable member being a pulley mounted on said annular element, the two rings having an internal wall that is a friction surface cooperative with an external wall of said annular element.

4. The apparatus of claim 1, said prestressing means for exerting an adjustable amount of force.

5. The apparatus of claim 1, said annular element being connected by a free wheel to one of the members.

6. An apparatus comprising:
   at least a pair of members of which one of the members is relatively movable with respect to another of the members under a directional force applied by an external stimulus, the relative movement of the members causes a relative displacement of a pair of friction surfaces so as to convert the external stimulus into a friction force so as to control the movement of said one of the members;
   a prestressing means for pressing on said pair of friction surfaces, the members being cooperative with said prestressing means, the directional force controlling an amount of the relative displacement, a force in a direction opposite said directional force causing a blocking of the relative displacement, the members being rotationally movable with respect to each other, the pair of members being movable with respect to each other in a rectilinear translation movement; and
   a means for transforming said rectilinear translation movement into two rotational movements coaxial to the translation movement and in opposite directions.

7. The apparatus of claim 6, one of the pair of members being a rod having a first threaded portion with left-hand threads and a second threaded portion with right-hand threads, a first nut being threadedly affixed to said first threaded portion and a second nut being threadedly affixed to said second threaded portion.

8. The apparatus of claim 7, said rod having annular-shaped discs inserted thereinto.

9. The apparatus of claim 8, said first and second nuts and annular-shaped discs being received in a body, said body containing said prestressing means.

10. The apparatus of claim 7, one of said first and second nuts being mounted in series with a free wheel.

\* \* \* \* \*